3,763,267
REMOVING DIALKYL SULFATES FROM AN
ALKYLATION REACTION EFFLUENT
William R. Hollowell, Houston, Tex., assignor to
Texaco Inc., New York, N.Y.
Filed Aug. 5, 1971, Ser. No. 169,283
Int. Cl. C07c 3/54
U.S. Cl. 260—683.46                                   5 Claims

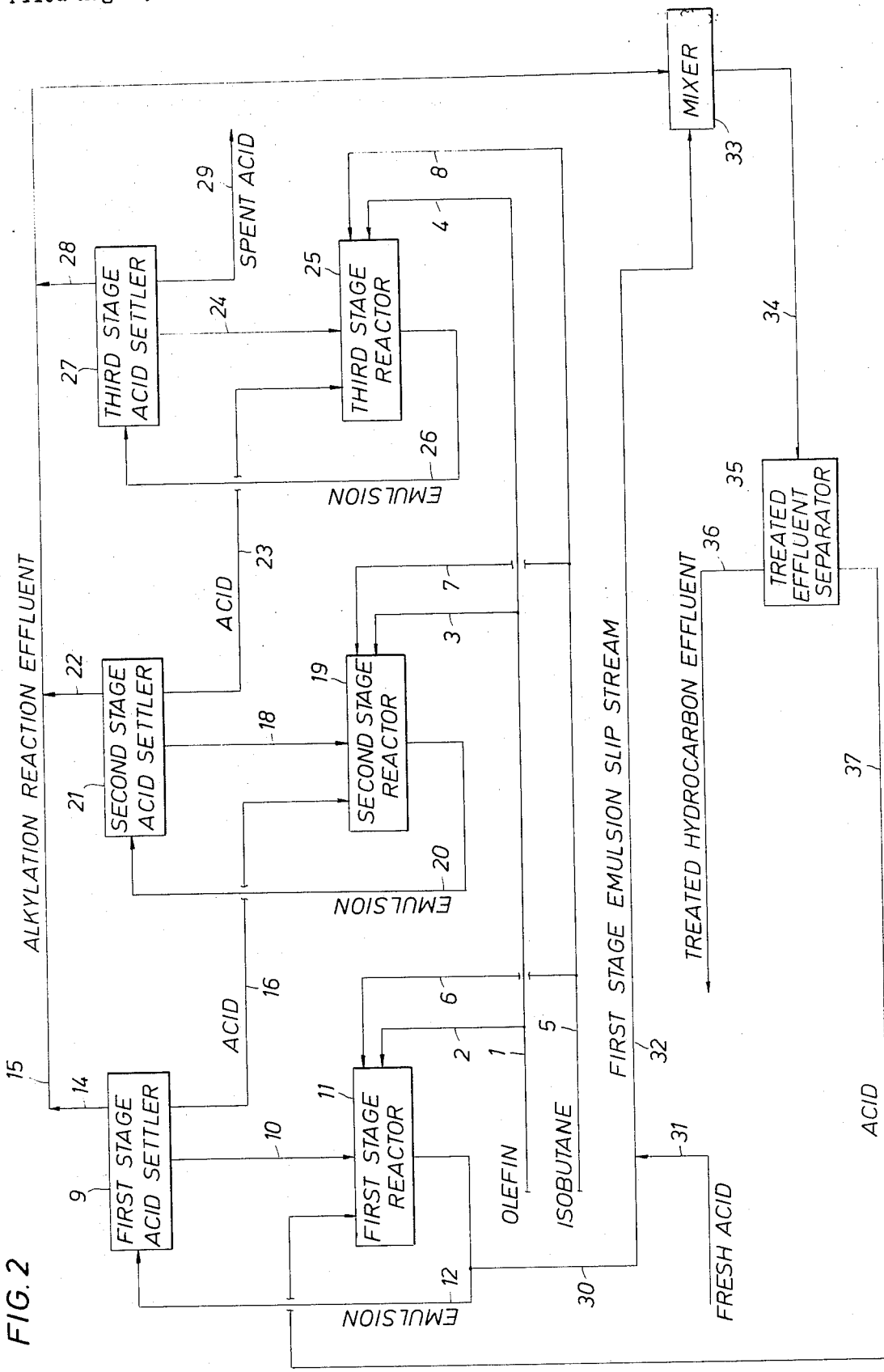

ABSTRACT OF THE DISCLOSURE

A multi-stage alkylation process for alkylating lower isoparaffins with lower olefins in the presence of sulfuric acid catalyst wherein dialkyl sulfates are removed from an alkylation reaction effluent stream by a sulfuric acid treatment step.

BACKGROUND OF THE INVENTION

This invention relates to a sulfuric acid catalyzed alkylation process. More particularly, this invention relates to an alkylation process wherein an alkylation reaction effluent stream is treated to reduce the alkyl sulfate content thereof.

The presence of alkyl sulfates, even in small amounts, in an alkylation reaction effluent stream creates processing problems when the alkylation reaction effluent stream is treated to recover an alkylated product therefrom. Commonly, an alkylation reaction effluent stream is subjected to fractional distillation wherein the alkylated product is separated from unreacted alkylation reaction charge hydrocarbons. When alkyl sulfates are present in an alkylation reaction effluent, they tend to decompose into acidic materials particularly in the reboiler of the fractional distillation system. Such acidic materials contribute to the corrosion of the equipment employed in the fractional distillation system. Additionally, the alkyl sulfates contribute to the formation of deposits which accumulate within the fractional distillation system thereby decreasing the operating efficiency of such system. Eventually accumulations of deposits require that the fractional distillation system be shut down for the removal of such accumulated deposits.

The presence of dialkyl sulfates in a gasoline boiling range alkylate, such as produced by the alkylation of a lower olefin with a lower isoparaffin, reduces the lead response of such alkylate. That is, the addition of a lead compound to increase the octane number of an alkylate containing alkyl sulfates will not produce as great an increase in octane number as in an alkylate free of alkyl sulfates. The presence of alkyl sulfates, particularly dialkyl sulfates in an alkylate decreases the ability of lead alkyl compounds to increase the octane number of the alkylate. In some cases, where alkyl sulfates are present in appreciable amounts such as in the range of about 0.01% or higher, the addition of tetraethyl lead in an amount of about 3 cc. per gallon of alkylate will not increase the octane number of said alkylates.

It is known, for example, in U.S. Pat. 2,758,142 that dialkyl sulfates may be removed from hydrocarbon streams by treating said streams with concentrated sulfuric acid and a lower isoparaffin hydrocarbon. It is also known, for example, in U.S. Pat. 3,325,391 that an alkylation reaction effluent stream may be treated with fresh concentrated sulfuric acid to remove the dialkyl sulfates from said alkylation reaction effluent streams. According to these known methods of removing alkyl sulfates from hydrocarbons, fresh concentrated sulfuric acid is employed. Such fresh sulfuric acid is described as being free of alkylation side-reaction products. In employing these methods for treating an alkylation reaction effluent stream, it is necessary that sufficient sulfuric acid be employed to remove the alkyl sulfates from the alkylation reaction effluent stream. Although the sulfuric acid after having been used to treat the alkylation reaction effluent stream may be subsequently employed in the alkylation reaction, the acid requirement for treating the alkylation reaction effluent stream may be substantially larger than the acid requirement of the alkylation reaction itself. Therefore, the amount of sulfuric acid consumed per gallon of alkylate produced may be economically prohibitive.

It is also known to treat an alkylation reaction effluent stream with spent acid from an alkylation process to remove any alkyl sulfates therefrom. Such a spent acid has a concentration of from about 85 to 91% sulfuric acid and contains substantial amounts of alkylation side-reaction products. By treating an alkylation effluent stream with such a spent acid, a portion of the side-reaction products may be extracted into the alkylation effluent stream thereby adversely affecting the quality of the alkylated products. Also, since the spent acid is discarded after being used to remove the alkyl sulfates, these alkyl sulfates are lost to the alkylation process.

SUMMARY OF THE INVENTION

According to the present invention, I have discovered an alkylation process wherein an alkylation reaction effluent stream may be treated to remove alkyl sulfates therefrom and wherein the alkyl sulfates are subsequently returned to the alkylation reaction for conversion into additional amounts of alkylated hydrocarbon. In the method of my invention, a multi-stage alkylation reaction is employed, each stage of which comprises a reaction zone and an acid settling zone. In the reaction zone of each stage an olefin hydrocarbon and an isoparaffin hydrocarbon to be alkylated are emulsified with an acid stream under alkylating conditions. Effluent from each reaction zone is transferred into an acid settling zone connected therewith wherein the acid is separated from the hydrocarbon phase. A hydrocarbon stream is recovered for each acid settler and all such hydrocarbon streams are combined to form an alkylation reaction effluent stream. A portion of the sulfuric acid recovered from each acid settling zone is returned to its associated reaction zone and the remainder of said recovered acid is transferred serially from stage to stage in the alkylation process. Fresh, concentrated sulfuric acid is added to the first stage of the alkylation process and spent sulfuric acid is removed from the last stage of the alkylation process. According to the present invention, a sulfuric acid containing stream from the first alkylation process stage is employed to treat the alkylation reaction effluent stream thereby removing alkyl sulfates from said effluent stream. After such treatment the alkylation reaction effluent is separated from the sulfuric acid and the sulfuric acid containing alkyl sulfates is returned to the alkylation process. The separated alkylation reaction effluent, substantially free of alkyl sulfates, is then treated in a conventional manner to recover alkylated hydrocarbons therefrom.

By following the method of the present invention, an alkylation process for the conversion of lower olefins and lower isoparaffins into alkylated hydrocarbons suitable for gasoline may be carried out wherein such alkylated hydrocarbons are recovered substantially free of alkyl sulfates. The alkylated hydrocarbons have good octane improvement response to lead compounds. Such an alkylation process is performed without employing excess sulfuric acid to treat the alkylation reaction effluent. Additionally, alkyl sulfates recovered from the alkylation reaction effluent are returned to the alkylation reaction for conversion into alkylated hydrocarbons and the alkylation reaction effluent stream is not exposed to a spent acid stream containing substantial amounts of impurities.

These and other advantages of the present invention will be more fully described in the detailed description of the invention which follows.

BRIEF DESCRIPTION OF THE DRAWINGS

FIG. 2 of the drawing is a schematic representation of one embodiment of the present invention wherein first stage sulfuric acid-hydrocarbon emulsion is employed to treat the alkylation reaction effluent.

DETAILED DESCRIPTION OF THE DRAWINGS

Figure 1:
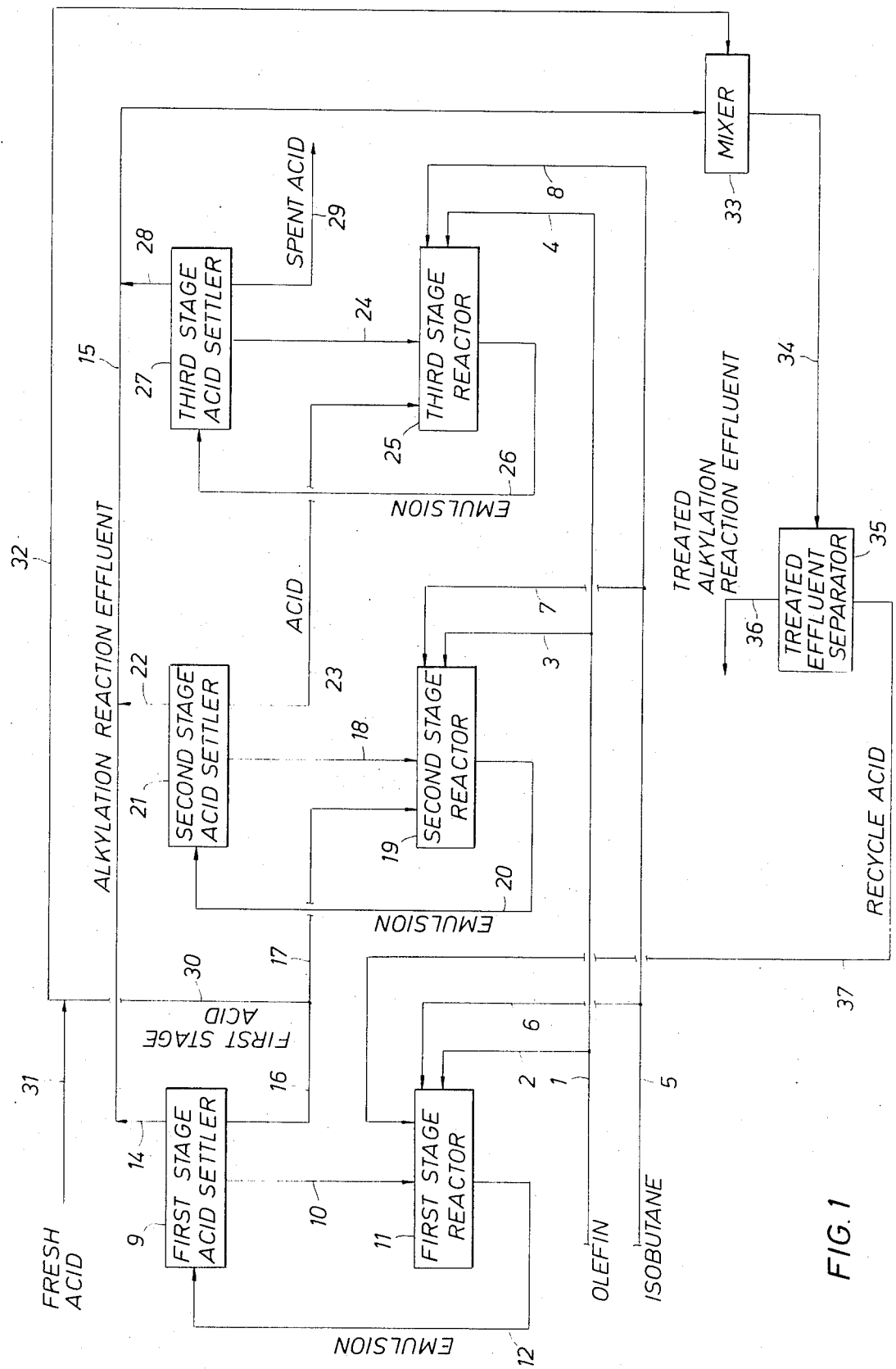
FIG. 1 of the drawings is a schematic representation of one embodiment of the present invention wherein first stage sulfuric acid is employed to treat the alkylation reaction effluent.

The alkylation process contemplated in the present invention comprises a multi-stage process wherein hydrocarbon reactants are introduced into each stage and wherein fresh sulfuric acid is introduced into the first stage. Sulfuric acid is then transferred serially from one stage to the other until, in the last stage, spent sulfuric acid is removed from the process. Such an alkylation process may comprise from two to about four or more stages. In each stage, sulfuric acid, olefin, and isoparaffin are introduced into a reaction zone wherein they are violently agitated to form an emulsion which assures intimate contact between the acid catalyst and the hydrocarbon reactants. From the reaction zone the emulsion is transferred into an acid settling zone wherein the emulsion is separated into a hydrocarbon phase and an acid phase. A portion of the acid from the acid settling zone is returned to the reaction zone and another portion of the acid is transferred to the reaction zone associated with the next stage in the alkylation process. A hydrocarbon stream comprising alkylated hydrocarbons, unreacted isoparaffins, and small amounts of alkyl sulfates is recovered from each acid settling zone. Such hydrocarbon streams from all the stages are combined to form an alkylation reaction effluent stream.

Olefin and isoparaffin reactants are added to each stage of the process. Fresh, concentrated sulfuric acid is added to the first stage and spent acid is removed from the last stage of the alkylation process.

Such an alkylation process is useful for the alkylation of isoparaffins with olefins to produce gasoline range hydrocarbons. The alkylation reaction may take place over a wide range of temperatures ranging from below 0° F. to about 100° F. when alkylating isoparaffins. The preferred temperature range is from about 30° F. to about 50° F. Such a process may be conveniently carried out at or below atmospheric pressure or at superatmospheric pressure so long as the reactants are maintained in the liquid phase. Such an alkylation process is particularly well suited for the alkylation of isoparaffins with olefins to form high octane gasoline components. The isoparaffins employed may be isobutane, isopentane, isohexane, etc. or mixtures thereof, and the olefins may comprise propenes, butenes, pentenes, their isomers and mixtures thereof. The hydrocarbon charge to such an alkylation process may comprise commercial mixtures of paraffins and commercial mixtures of olefins which comprise primarily paraffins and olefins having about 3 to 6 carbon atoms. Such commercial mixtures contain substantial amounts of normal paraffins as well as the desired isoparaffin and olefin reactants.

In such alkylation processes, the ratio of isoparaffins to olefins charged to the reaction zone is maintained high such that essentially all of the olefins are reacted within the reaction zone. Therefore, the emulsion withdrawn from the alkylation reactor and transferred into the acid settler is essentially free of olefinic hydrocarbon. The molar ratio of isoparaffins to olefins which may be employed may be from about 4/1 to about 30/1, preferably from about 8/1 to about 20/1.

The fresh concentrated sulfuric acid supplied to the first stage of the alkylation process contains sulfuric acid in a concentration from about 94% to about 99% or higher. Preferably the concentration of the fresh sulfuric acid is about 98% or higher. As the sulfuric acid is employed in the alkylation reaction, its concentration decreases due to the accumulation of acid soluble polymeric oils, water and other impurities. Thus, the acid concentration is highest in the first stage of the alkylation process and decreases in each succeeding stage, and the amount of contaminants in the acid increases from stage to stage. In the last stage of the alkylation process the acid concentration is lowest and the contaminate level of the acid is highest. A portion of the acid from the separation zone of the last stage is withdrawn to maintain the acid concentration in said last stage sufficiently high to provide good catalytic activity for the alkylation reaction performed therein. By removing acid as a spent acid stream from the last stage, contaminates which dilute the sulfuric acid are removed from the alkylation process. The fresh, concentrated sulfuric acid is added to the first stage in sufficient amounts to make up for the sulfuric acid consumed in the alkylation process and to make up for the amount of spent acid removed from said process.

The concentration of alkyl sulfates present in the acid settler hydrocarbon phase increases from stage to stage as the acid concentration of the sulfuric acid catalyst decreases. Consequently, the first stage acid settler hydrocarbon phase contains less alkyl sulfate contaminants than the acid settler hydrocarbon phases of the subsequent alkylation process stages. Presumably, this phenomenon results because the rate of an alkylation reaction decreases as the acid concentration of the sulfuric acid catalyst decreases. Consequently the alkylation reaction intermediate alkyl sulfates increase in the reaction emulsion and upon separation of a hydrocarbon phase in an acid settler the alkyl sulfate concentration in such a hydrocarbon phase is increased.

It is known that the dialkyl sulfates of lower olefins such as propylene and butylene are hydrocarbon soluble. These dialkyl sulfates tend to dissolve into the hydrocarbon phase present in an acid settler. As the hydrocarbon phases are combined, the dialkyl sulfates are carried into the alkylation reaction effluent. It is also known that mono-alkyl sulfates of the same olefins are more soluble in sulfuric acid and tend to dissolve into the sulfuric acid phase. It is known that when an alkylation reaction effluent containing dialkyl sulfates is intimately contacted with concentrated sulfuric acid, in the absence of substantial amounts of olefinic hydrocarbons, that the dialkyl sulfates will react with a portion of the sulfuric acid to form mono-alkyl sulfates which then dissolve into the sulfuric acid phase. Subsequent to such a contact, the acid phase may be separated from the hydrocarbon phase and substantially all of the dialkyl sulfates will be removed from the hydrocarbon phase. It has also been determined that an alkylation reaction effluent after such a treatment and after a caustic and/or water wash to remove any free sulfuric acid, may be subjected to a distillation process to recover the alkylate therefrom without experiencing corrosion of the distillation equipment or precipitation of high molecular weight materials which foul the distillation equipment. It has also been determined that an alkylate containing about 0.1% alkyl sulfates and which exhibited no octane improvement upon addition of about 3 cc. of tetraethyl lead per gallon of alkylate when subjected to such a sulfuric acid treatment will then show a substantial octane increase upon addition of tetraethyl lead.

Now in accordance with the present invention I have discovered that the alkylation reaction effluent from a multi-stage alkylation process may be treated with the sulfuric acid from the first stage of said process to thereby substantially remove alkyl sulfates from said alkylation effluent. Fresh sulfuric acid in a concentration from about 95% to about 99% is charged to the first stage of a multistage alkylation process and acid is serially transferred from stage to stage. An alkylation reaction effluent from such a process is treated with sulfuric acid from said first stage to remove the dialkyl sulfates from the alkylation reaction effluent. In one embodiment of the present invention a slip stream of sulfuric acid is recovered from the first stage acid settling zone and is employed to treat the alkylation reaction effluent stream. Subsequent to treating said alkylation reaction effluent, the acid is separated and is preferably returned to the first stage of the alkylation process. Alternatively, a portion of the acid may be returned to the second stage of the alkylation process. Fresh, concentrated sulfuric acid may be added directly to the first stage of the alkylation process or it may be employed along with the acid slip stream from the first stage to treat the alkylation reaction effluent and then be transferred to the first stage of the alkylation process. Since the hydrocarbon phase from the first stage acid settler contains only a small amount of dialkyl sulfates, an alternative to treating the entire alkylation reaction effluent stream may be employed. In the alternative, the first stage hydrocarbon phase may be recovered separately from the hydrocarbon phases of the subsequent reaction stages. The hydrocarbon phases of the subsequent stages is then treated with sulfuric acid as described above and, upon separation of the sulfuric acid, the first stage hydrocarbon phase may be combined with the treated hydrocarbon phases. The advantages of this alternative is that the ratio of acid to hydrocarbon is increased in the treating step, thereby improving removal of dialkyl sulfate from the hydrocarbon.

In another embodiment of this invention, a slip stream of the emulsion effluent from the first stage reactor of the alkylation process may be employed to treat the alkylation reaction effluent to remove dialkyl sulfates therefrom. The sulfuric acid phase in the emulsion effluent has a high surface area which enhances the contact of sulfuric acid with the dialkyl sulfates contained in the hydrocarbon phase. After treatment, the reaction effluent-emulsion mixture is separated into an acid phase and a hydrocarbon phase. The hydrocarbon component of the first stage reaction effluent is recovered with the treated alkylation reaction effluent. The separated acid phase may be alternatively returned to the first stage or the second stage of the alkylation process. The fresh make up sulfuric acid to the alkylation process may, in the case where the acid phase is returned to the first stage, be employed along with the first stage emulsion to treat the alkylation reaction effluent. Otherwise, the fresh make up sulfuric acid is charged directly to the first stage of the alkylation process.

In carrying out the method of the present invention, the fresh, concentrated sulfuric acid supplied to the alkylation process will have a concentration of from about 95% to about 99% or higher sulfuric acid, the acid from the first stage will have a concentration in the range of from about 94% to about 97% or higher sulfuric acid. It has been found that when the first stage acid is within the above-defined range, it is suitable for treating the alkylation reaction effluent to remove alkyl sulfates therefrom. Such a first stage acid has sufficient strength to convert dialkyl sulfates contained in the alkylation reaction effluent stream into mono-alkyl sulfates which are soluble in an acid phase. Also, the amount of contaminates such as water and polymerized oil is sufficiently low such that the first stage acid will not adulterate or cause unwanted side-reactions in the alkylation reaction effluent stream.

In order for the first stage acid to remove dialkyl sulfates from the alkylation effluent stream, it is necessary that good contact is established between the acid stream and the effluent stream. Preferably a means of high shear mixing is employed wherein the sulfuric acid is broken down into finely divided droplets having a large surface area. By this means, good contact between the acid and the effluent stream may be obtained thereby allowing reaction of the dialkyl sulfates with the sulfuric acid. Mixing devices which will provide the necessary contact between the sulfuric acid and the effluent stream include centrifugal pumps, high speed agitators, in-line blenders, and other high shear mixing devices.

The ratio of sulfuric acid to alkylation reaction effluent must be such that substantially all of the alkyl sulfates in the effluent stream will react with sulfuric acid to form mono-alkyl sulfates and substantially all of such monoalkyl sulfates will dissolve into the acid phase. It has been found that ratios of sulfuric acid to alkylation reaction effluents in the range of from about 5 lbs./bbl. to about 15 lbs./bbl. or higher are satisfactory.

Subsequent to the contact of the first stage sulfuric acid and the alkylation reaction effluent wherein dialkyl sulfates are converted to mono-alkyl sulfates and are dissolved into the acid phase, the acid phase is separated from the alkylation reaction effluent. Such phase separation between sulfuric acid and alkylation reaction effluent may be obtained by methods such as gravity settling, coalescence, electrostatic precipitation, or other known liquid phase separation techniques. Upon separation of the acid phase from the alkylation reaction effluent, the acid phase containing substantially all the dialkyl sulfates is returned to the alkylation process.

The treated alkylation reaction effluent substantially free of alkyl sulfates is recovered from the acid-effluent separation step and is subjected to conventional treating methods to recover alkylated hydrocarbons therefrom. For example, the treated alkylation reaction effluent may be subjected to a caustic and/or water wash to neutralize and remove any small amount of sulfuric acid therefrom, and may then be subjected to conventional fractional distillation wherein an alkylated hydrocarbon product is recovered and wherein excess isoparaffin hydrocarbons are recovered for recycle to the alkylation process.

The method of the present invention may be better understood by reference to the attached drawings. FIG. 1 shows a schematic flow diagram of one embodiment of the present invention wherein the alkylation reaction effluent is treated with sulfuric acid from the first stage acid settler. In the drawing a process is shown for the production of 860 barrels per hour of alkylate by reacting isobutane with an olefin stream comprising about 70% propylene and about 30% butylene. Isobutane is employed in an excess amount such that the alkylation reaction effluent stream comprises 860 barrels per hour alkylated hydrocarbon and 6,940 barrels per hour of isobutane. Acid consumption in the alkylation process is approximately 0.6 pounds per gallon of alkylate, thus requiring a fresh concentrated acid makeup stream of about 21,000 pounds per hour. The dialkyl sulfate concentration in the alkylation reaction effluent stream is approximately 1,000 parts per million.

Olefin hydrocarbon is supplied to the alkylation process via line 1. From line 1 the olefin hydrocarbon is supplied to the first stage reactor via line 2; to the second stage reactor via line 3; and to the third stage reactor via line 4. Isobutane hydrocarbon is supplied to the alkylation process via line 5. From line 5 isobutane is supplied to the first stage reactor via line 6; to the second stage reactor via line 7; and to the third stage reactor via line 8.

In the first stage of the alkylation process, sulfuric acid from the first stage acid settler 9 is transferred via line 10 into the first stage reactor 11. In the first stage reactor 11 sulfuric acid, olefin, and isobutane are vigorously mixed at a temperature of between about 30° F. and about 60° F., in the liquid phase, such that essentially all of the olefin hydrocarbon reacts with isobutane to form alkylated hydrocarbon. A minor amount of olefin reacts with the sulfuric acid to form dialkyl sulfates which are not converted into alkylated hydrocarbons before the reaction mixture leaves the first stage reactor 11. The reaction mixture, comprising an emulsion of sulfuric acid and hydrocarbon, is transferred from the first stage reactor 11 via line 12 into the first stage acid settler 9. The emulsion is separated into a hydrocarbon phase and an acid phase in the first stage acid settler 9 by gravity settling.

Hydrocarbon phase from the first stage acid settler 13 is withdrawn via line 14 and transferred into the alkylation reaction effluent line 15. Sulfuric acid is withdrawn from the first stage acid settler 13 via line 16. From line 16 sulfuric acid is transferred via line 17 into a second stage reactor 19.

In the second stage of the alkylation process, sulfuric acid from a second stage acid settler 21 is transferred via line 18 into the second stage reactor 19 wherein sulfuric acid is vigorously mixed with olefin and isobutane reactants. From the second stage reactor 19, the reaction effluent emulsion is transferred via line 20 into the second stage acid settler 21. The second stage emulsion is separated into a hydrocarbon phase and an acid phase by gravity settling in the second stage acid settler 21. The hydrocarbon phase is transferred from the second stage acid settler 21 via line 22 into the alkylation reaction effluent line 15. Sulfuric acid from the second stage acid settler 21 is transferred via line 23 into a third stage reactor 25.

In the third stage of the alkylation process, sulfuric acid from the third stage acid settler 27 is transferred via line 24 into the third stage reactor 25 wherein the sulfuric acid is vigorously mixed with olefin and isobutane reactants. From the third stage reactor 25 reaction effluent emulsion is transferred via line 26 to the third stage acid settler 27. The emulsion is separated into a hydrocarbon phase and an acid phase by gravity settling in the third stage acid settler 27. Hydrocarbon phase from the third stage acid settler 27 is transferred via line 28 into the alkylation reaction effluent line 15. Spent sulfuric acid is withdrawn from the third stage acid settler 27 via line 29 through which the spent sulfuric acid is removed from the alkylation process.

A slip stream comprising 57,000 pounds per hour of sulfuric acid from the first stage of the alkylation process is recovered from line 16 via line 30. Fresh concentrated sulfuric acid makeup to the alkylation process is mixed with the slip stream of first stage acid in line 30 via line 31. Such fresh concentrated sulfuric acid is supplied at a rate of about 21,000 pounds per hour. The mixture of fresh acid and first stage acid is transferred via line 32 to a mixer 33. Alkylation reaction effluent in line 15, comprising hydrocarbon effluent streams from the first, second, and third stage of the alkylation process is transferred via line 15 into the mixer 33, at a rate of about 7,800 barrels per hour. In the mixer 33 the alkylation reaction effluent and the sulfuric acid are vigorously mixed in the liquid phase such that substantially all of the dialkyl sulfates contained in the alkylation reaction effluent are converted to mono-alkyl sulfate and are dissolved into the acid phase. Such mixing of the alkylation reaction effluent and the sulfuric acid is conveniently obtained by passing these streams together through a high speed centrifugal pump, such that an emulsion of finely divided droplets of sulfuric acid suspended in alkylation reaction effluent is formed.

From the mixer 33 the emulsion of sulfuric acid in alkylation reaction effluent is transferred via line 34 into a treated effluent separator 35. The effluent is separated into a treated alkylation reaction effluent phase and a recycle acid phase by gravity separation in the treated effluent separator 35. Treated alkylation reaction effluent, substantially free of alkyl sulfates, is recovered from the treated effluent separator 35 via line 36. From line 36 the treated alkylation reaction effluent is removed from the alkylation process for further conventional treatment, not shown, to recover alkylated hydrocarbons therefrom. Recycle acid containing substantially all of the alkyl sulfates removed from the alkylation effluent stream is transferred from the treated effluent separator 35 via line 37 at a rate of about 79,000 pounds per hour. From line 36 the recycle acid stream is returned to the first stage reactor 11 of the alkylation process.

By following method of the present invention as described above, an alkylation reaction effluent containing about 1,000 parts per million of alkyl sulfate is treated with sulfuric acid from the first stage of the alkylation process to produce a treated alkylation reaction effluent containing about 10 parts per million of sulfur compounds.

Reference is now made to FIG. 2 of the drawings which shows a schematic flow diagram of a process wherein an emulsion slip stream from a first stage alkylation reactor is employed to treat an alkylation reaction effluent stream. In the drawing a process is shown for the production of 860 barrels per hour of alkylate by reacting isobutane with an olefin stream comprising 70% propylene and 30% butylene. Isobutane is employed in an excess amount such that the alkylation reaction effluent stream comprises 860 barrels per hour alkylated hydrocarbon and 6,940 barrels per hour of isobutane. Acid consumption in the alkylation process is approximately 0.6 pounds per gallon of alkylate, thus requiring a fresh concentrated acid makeup stream of about 21,000 pounds per hour. The dialkyl sulfate concentration in the alkylation reaction effluent stream is approximately 1,000 parts per million.

Olefin hydrocarbon is supplied to the alkylation process via line 1. From line 1 the olefin hydrocarbon is supplied to the first stage reactor via line 2; to the second stage reactor via line 3; and to the third stage reactor via line 4. Isobutane hydrocarbon is supplied to the alkylation process via line 5. From line 5 isobutane is supplied to the first stage reactor via line 6; to the second stage reactor via line 7; and to the third stage reactor via line 8.

In the first stage of the alkylation process, sulfuric acid from a first stage acid settler 9 is transferred via line 10 into a first stage reactor 11. In the first stage reactor 11 sulfuric acid, olefin, and isobutane are vigorously mixed at a temperature of between about 30° F. and about 60° F., in the liquid phase, such that essentially all of the olefin hydrocarbon reacts with isobutane to form alkylated hydrocarbon. A minor amount of olefin reacts with the sulfuric acid to form dialkyl sulfates which are not converted into alkylated hydrocarbons before the reaction mixture leaves the first stage reactor 11. The reaction mixture, comprising an emulsion of hydrocarbon and sulfuric acid, is transferred from the first stage reactor 11 via line 12 into the first stage acid settler 9. The emulsion is separated into a hydrocarbon phase and an acid phase in the first stage acid settler 9 by gravity settling.

Hydrocarbon phase from the first stage acid settler 9 is withdrawn via line 14 and transferred into the alkylation reaction effluent line 15. Sulfuric acid is withdrawn from the first stage acid settler 9 via line 16. From line 16 sulfuric acid is transferred into a second stage reactor 19.

In the second stage of the alkylation process, sulfuric acid from a second stage acid settler 21 is transferred via line 18 into the second stage reactor 19 wherein sulfuric acid is vigorously mixed with olefin and isobutane reactants. From the second stage reactor 19, the reaction effluent emulsion is transferred via line 20 into the second stage acid settler 21. The second stage emulsion is separated into a hydrocarbon phase and an acid phase by gravity settling in the second stage acid settler 21. The hydrocarbon phase is transferred from the second stage acid settler 21 via line 22 into the alkylation reaction effluent line 15. Sulfuric acid from the second stage acid settler 21 is transferred via line 23 into a third stage reactor 25.

In the third stage of the alkylation process, sulfuric acid from a third stage acid settler 27 is transferred via line 24 into the third stage reactor 25 wherein the sulfuric acid is vigorously mixed with olefin and isobutane reactants. From the third stage reactor 25 reaction effluent emulsion is transferred via line 26 to the third stage acid settler 27. The emulsion is separated into a hydrocarbon phase and an acid phase by gravity settling in the third stage acid settler 27. Hydrocarbon phase from the third stage acid settler 27 is transferred via line 28 into the alkylation reaction effluent line 15. Spent sulfuric acid is withdrawn from the third stage acid settler 27 via line 29 through which the spent sulfuric acid is removed from the alkylation process.

A slip stream of about 114,000 pounds per hour of first stage reactor emulsion comprising about 57,000 pounds per hour of sulfuric acid from the first stage of the alkylation process is recovered from line 12 via line 30. Fresh concentrated sulfuric acid makeup to the alkylation process is mixed with the slip stream of first stage acid in line 30 via line 31. Such fresh concentrated sulfuric acid is supplied at a rate of about 21,000 pounds per hour. The mixture of fresh acid and first stage reactor emulsion is transferred via line 32 to a mixer 33. Alkylation reaction effluent in line 15, comprsing hydrocarbon effluent streams from the first, second, and third stage of the alkylation process is transferred via line 15 into the mixer 33, at a rate of about 7,345 barrels per hour. In the mixer 33 the alkylation reaction effluent and the first stage reactor emulsion are vigorously mixed in the liquid phase such that substantially all of the dialkyl sulfates contained in the alkylation reaction effluent are converted to monoalkyl sulfates. Such mixing of the alkylation reaction effluent and the sulfuric acid is conveniently obtained by passing these streams together through a high speed centrifugal pump, such that an emulsion of finely divided droplets of sulfuric acid suspended in alkylation reaction effluent is formed.

From the mixer 33 the emulsion of sulfuric acid in alkylation reaction effluent is transferred via line 34 into a treated effluent separator 35. The effluent is separated into a treated alkylation reaction effluent phase and a recycle acid phase by gravity separation in the treated effluent separator 35. Treated alkylation reaction effluent, substantially free of alkyl sulfates, is recovered from the treated effluent separator 35 via line 36. From line 36 the treated alkylation reaction effluent is removed from the alkylation process for further conventional treatment, not shown, to recover alkylated hydrocarbons therefrom. Recycle acid containing substantially all of the alkyl sulfates removed from the alkylation effluent stream is transferred from the treated effluent separator 35 via line 37 at a rate of about 79,000 pounds per hour. From line 37 the recycle acid stream is returned to the first stage reactor 11 of the alkylation process.

By following method of the present invention as described above, an alkylation reaction effluent containing about 1,000 parts per million of alkyl sulfate is treated with first stage reaction emulsion from an alkylation process to produce a treated alkylation reaction effuent containing about 10 parts per million of sulfur compounds.

The alkylation processes as shown in the drawings and described above are schematic representations made to show the method of the present invention and many conventional items of equipment normally employed in an alkylation process, but unnecessary to describe the method of the present invention, have been omitted. Such equipment as pumps, valves, instrumentation, and refrigeration equipment commonly employed in a sulfuric acid alkylation process may be provided by one skilled in the art.

Many modifications in the flow scheme of a sulfuric acid alkylation process may be made by one skilled in the art which do not depart from the spirit and scope of the present invention. All such modifications which do not depart from the spirit and scope of the present invention are herein included.

I claim:
1. In a multi-stage sulfuric acid catalyzed alkylation process wherein isoparaffin hydrocarbons are alkylated with olefin hydrocarbons, wherein a portion of sulfuric acid catalyst phase is transferred serially from stage to stage, wherein a hydrocarbon phase comprising alkylated hydrocarbons, isoparaffin hydrocarbons and alkyl sulfates is separated from a sulfuric acid catalyst phase of each stage, and wherein hydrocarbon phases are combined to form an alkylation reaction effluent; the improvement for removing alkylsulfates from the alkylation reaction effluent which comprises:
   (a) treating the alkylation reaction effluent with sulfuric acid catalyst separated from the first alkylation reaction stage, said catalyst having a sulfuric acid concentration of about 94 to about 98% by weight;
   (b) separating the treated alkylation reaction effluent phase from the sulfuric acid catalyst phase; and
   (c) recycling separated sulfuric acid catalyst phase from step (b) to the alkylation reaction stages of said process.
2. The method of claim 1 wherein a portion of said separated first stage sulfuric acid catalyst phase is employed to treat the alkylation reaction effluent.
3. The method of claim 2 wherein fresh make-up sulfuric acid is added to said treating step (a).
4. The method of claim 1 wherein the acid from the separation step is recycled to the first stage of the multi-stage sulfuric acid catalyzed alkylation process.
5. The method of claim 1 wherein the olefin is selected from the group consisting of propene, butenes, pentenes and mixtures thereof, and wherein the isoparaffin is isobutane.

References Cited
UNITED STATES PATENTS

| 2,351,464 | 6/1944 | Voorhies, Jr. et al. | 260—683.46 |
| 3,467,729 | 9/1969 | Rodgers | 260—683.62 |

FOREIGN PATENTS

| 540,449 | 10/1941 | England | 260—683.62 |

DELBERT E. GANTZ, Primary Examiner

G. J. CRASANAKIS, Assistant Examiner

U.S. Cl. X.R.

260—683.62